United States Patent [19]

DeBoer et al.

[11] Patent Number: 5,387,649
[45] Date of Patent: Feb. 7, 1995

[54] POLYMER PRODUCTION

[75] Inventors: Eric J. M. DeBoer; Fred F. Hage; Adriaan A. Van Der Huizen, all of Amsterdam, Netherlands; Carl L. Willis, Houston, Tex.

[73] Assignee: Shell Oil Company, Houston, Tex.

[21] Appl. No.: 258,807

[22] Filed: Jun. 13, 1994

Related U.S. Application Data

[62] Division of Ser. No. 991,934, Dec. 17, 1992, Pat. No. 5,364,911.

[30] Foreign Application Priority Data

Dec. 20, 1991 [EP] European Pat. Off. ............ 91203390

[51] Int. Cl.$^6$ ................................................. C08F 8/42
[52] U.S. Cl. ................................. 525/271; 525/272; 525/299; 525/309; 525/314; 525/323; 525/324; 525/331.7; 525/333.7; 525/366
[58] Field of Search ............... 525/366, 271, 272, 299, 525/309, 314, 323, 324

[56] References Cited

U.S. PATENT DOCUMENTS

| | | |
|---|---|---|
| 3,632,678 | 1/1972 | Ehrig et al. |
| 4,078,019 | 3/1978 | Langer, Jr. |
| 4,480,075 | 10/1984 | Willis |
| 4,761,456 | 8/1988 | Lund et al. ........................ 525/331.7 |

FOREIGN PATENT DOCUMENTS

| | | |
|---|---|---|
| 264214A2 | 4/1988 | European Pat. Off. |
| 1525462 | 4/1968 | France |
| 1911886 | 3/1969 | Germany |
| 1595359A | 7/1970 | Germany |
| J5-9179527A | 3/1983 | Japan |
| 76-2054712A | 9/1985 | Japan |
| 1244351 | 9/1971 | United Kingdom |

OTHER PUBLICATIONS

Kogyo Kagaku Zasshi, 74(3), 481–4, 1971.

*Primary Examiner*—Bernard Lipman

[57] ABSTRACT

Novel metallated polyolefins are produced by contacting a polyolefin having a vinylidene group in the terminal portion with organoalkali metal compound in the presence of alkali metal t-alkoxide or tertiary amine. The metallated polyolefin is used to initiate the polymerization of polymerizable monomers to produce block copolymers of at least two blocks, at least one of which is saturated polyolefin.

9 Claims, No Drawings

POLYMER PRODUCTION

This is division of application Ser. No. 07/991,934, filed Dec. 17, 1992, now U.S. Pat. No. 5,364,911.

FIELD OF THE INVENTION

This invention relates to novel functionalized polyolefins, to a process for the production thereof and to block copolymers prepared therefrom.

BACKGROUND OF THE INVENTION

The use of organolithium compounds as initiators in polymerization of organic monomers is well known in the art. A particular use for the organolithium initiators is in the production of block copolymers having at least two polymeric block which differ in properties. Many conventional block copolymers are polymers of at least one block of polymerized vinylaromatic hydrocarbon, e.g. styrene, and at least one block of polymerized conjugated alkadiene, e.g., butadiene. Such polymers typically have a relatively narrow molecular weight distribution and, to the extent a block is produced from an alkadiene, the polymer will contain ethylenic unsaturation.

For some applications, it would be useful to produce block copolymer wherein one type of block has an unbranched, saturated polymeric chain which is terminally connected to adjacent blocks. It is very difficult, however, to produce this type of block directly by anionic polymerization. It is known to produce this type of block indirectly by selective hydrogenation of a block of polymerized alkadiene, but such indirect preparation introduces additional process steps and will be influenced by the type and configuration of the original polyalkadiene block. Moreover, this method of synthesis is not useful for the production of a block copolymer containing a saturated polyolefin block and, as a second type of block, polyalkadiene.

In Japanese Patent Application J5-9179-527-A, a method is disclosed for the production of a polypropylene-polystyrene block copolymer. A halogenated polypropylene is reacted with a lithiated polystyrene species produced by anionic polymerization of styrene. The process necessarily introduces halogen into the product mixture and is only useful for the production of diblock polymers.

Japanese Patent Application J6-2054-712-A discloses the preparation of modified polyolefins. An α-olefin is polymerized in the presence of a Ziegler-Natter catalyst. The polyolefin product is reacted with an organolithium compound and then copolymerized with added styrene. The polyolefin production is effected in the presence of a heterogenous catalyst system and the product has a broad molecular weight distribution with relatively little of the ethylenic unsaturation present in the terminal segment of the polymer. Metallation of the polyolefin results in a random arrangement of metal moieties and use of the metallated polymer as an ionic polymerization initiator results in production of a mixture of polymeric species with only a small portion thereof being of a linear type. Similar results are obtained by the process disclosed in German published Patent Application 1 595 359.

It would be of advantage to have a process for the production of block copolymers containing saturated polyolefin blocks which are linear and attached to any adjacent block through the terminal portion of the polyolefin block.

SUMMARY OF THE INVENTION

The present invention provides a process for the production of block copolymer wherein at least one block is a linear block of polyolefin which is attached to each adjacent block through a monomer unit in the terminal portion of the polyolefin. The process includes the production of, and the reaction with other monomers of, novel alkali metal metallated polyolefin resulting from anionic polymerization of at least one α-olefin, the metallated polyolefin comprising a metallic cation and an allylic anion present in or derived from the terminal monomer unit of the polyolefin. The allylic cation is located on the terminal monomer unit or on another monomer unit of the terminal portion of the polyolefin as the result of isomerization of the terminal allylic species.

DESCRIPTION OF THE INVENTION

The aliphatic α-olefin from which the metallated polyolefins are prepared is an α-olefin of from 2 to 18 carbon atoms inclusive, preferably from 2 to 12 carbon atoms inclusive, such as ethylene, propylene, 1-butene, 3-methyl-1-butene, 1-hexene and 1-octene. Best results are obtained with polyolefins prepared from α-olefins of 2 to 4 carbon atoms inclusive, particularly propylene. The poly-α-olefin is suitably a homopolymer or is a copolymer, but preferably is homopolymeric. For polyolefins other than polyethylene, the polyolefins of any steric configuration, e.g., isotactic, syndiotactic or atactic, are useful although, when appropriate, atactic polymers are preferred.

The polyolefins have a molecular weight from about 175 to about 250,000, with preferred polyolefins having a molecular weight from about 1,000 to about 50,000. The polyolefins have a vinylidene group in a terminal monomer of the polymeric chain or in a position is another non-terminal monomeric unit as a result of isomerization of the vinylidene-containing terminal monomeric unit. These polyolefins are produced by conventional technology as by the well-known α-olefin polymerization in the presence of a Ziegler-Natter catalyst. The products of the Ziegler-Natter type of polymerization are of relatively narrow molecular weight distribution and are characterized by the vinylidene group present in or obtained from the terminal monomer group as described above.

The metallated polyolefins of the invention are produced by metallating procedures in which the polyolefin as above described is contacted with an organoalkali metal compound in the presence of an alkali metal t-alkoxide or a tertiary amine in the presence of at least one aliphatic, including cycloaliphatic, hydrocarbon solvent. The organoalkali metal compound is preferably an alkylalkali metal compound wherein the alkali metal is lithium, sodium, potassium, rubidium or cesium. Alkyllithium compounds are preferred wherein the alkyl has from 2 to 8 carbon atoms inclusive. The alkali metal t-alkoxide is an alkoxide of lithium, sodium, potassium, rubidium or cesium wherein the alkoxide has 4 to 8 carbon atoms inclusive, e.g., t-butoxide, t-pentoxide or 1,1-dimethylhexoxide. Potassium t-alkoxides are preferred, particularly potassium t-butoxide. If a tertiary amine is employed in the metallation reaction mixture, the amine is preferably a ditertiary amine of up to 12 carbon atoms such as N,N,N', N'-tetraethylpropylenediamine or N,N,N', N'-tetramethylethylenediamine. Use of the latter diamine is preferred. The aliphatic hydrocarbon solvent is suitably an aliphatic, including cycloaliphatic, hydrocarbon of from 4 to 20 carbon atoms inclusive with better processes resulting from use of hydrocarbon solvents of from 5 to 10 carbon atoms inclusive. Illustrative hydrocarbon solvents include pentane, hexane, heptane, decane, dodecane, isooctane, cyclopentane and cyclohexane.

For the metallation process, the quantity of organoalkali-metal compound and alkali metal t-alkoxide or tertiary amine should be sufficient to react with substantially all of the vinylidene group of the polyolefin reactant to produce the metallated derivative. The quantity of hydrocarbon solvent should be sufficient to ensure adequate mixing of the reactants under metallation conditions, which contacting is facilitated by well-known methods such as shaking or stirring. The metallation conditions include a reaction temperature of from about $-50°$ C. to about $150°$ C. and any convenient pressure. For convenience, the metallation is often conducted under ambient pressure. In typical metallation reactions, at least about 70% of the vinylidene groups of the polyolefin are converted to metallated derivatives. In preferred metallation reactions, at least 95% of the vinylidene groups of the metallized polyolefin are converted to metallated derivative.

The metallated derivative of the polyolefin is obtained as a solution in the hydrocarbon solvent. If the solution contains excess organoalkali metal reactant of the metallation process, the activity of the excess reactant is destroyed by known methods including thermal treatment. A better method for destroying excess metal-containing reactants is by adding a small but at least stoichiometric quantity of an ether. Suitable ethers include tetrahydrofuran, 1,4-benzodioxane, 1,2-dimethyoxyethane, and diethyl ether, of which tetrahydrofuran gives the best results. Treatment to destroy excess metal-containing reactant is conducted by mixing the ether with the metallized polyolefin product mixture at ambient conditions. For most applications, the presence of ether/metal compound reaction product in the hydrocarbon solution of metallized polyolefin is not harmful and purification of the hydrocarbon solution is not required.

The metallated polyolefin, in another aspect of the invention, is employed to initiate the anionic polymerization of other polymerizable monomers by contacting readily polymerizable monomers in solution under polymerization conditions. The resulting product is a block polymer of at least two blocks, at least one of which blocks is a block of saturated polyolefin. The preferred anionically polymerizable monomers are illustrated by monoalkenyl aromatic hydrocarbons, conjugated alkadienes, $\alpha,\beta$-ethylenically unsaturated nitriles and amides.

The monoalkenyl aromatic hydrocarbons are styrene and styrene homologs of up to 12 carbon atoms. Such monoalkenyl aromatic hydrocarbons include styrene, p-methylstyrene, m-isopropylstyrene, $\alpha$-methylstyrene and $\alpha$,4-dimethylstyrene. Of these, styrene is preferred. Suitable conjugated alkadienes have up to 12 carbon atoms inclusive and are illustrated by 1,3-butadiene (butadiene), 2-methyl-1,3-butadiene (isoprene), 1,3-hexadiene, 2,3-dimethyl-1,3-pentadiene and 2-methyl-3-ethyl-pentadiene. Of these conjugated alkadienes, butadiene and isoprene are preferred, particularly butadiene. The useful alkyl esters of $\alpha,\beta$-ethylenically unsaturated esters include methyl acrylate, methyl methacrylate, butyl acrylate, and t-butyl methacrylate. Also suitable as the anionically polymerizable monomer for use in the polymerization process of the invention are the alkenyl aromatic hydrocarbons and the conjugated alkadienes.

The polymerization to produce block copolymer is effected in solution in an inert solvent. Useful solvents include hydrocarbon solvents such as hexane, heptane, cyclohexane, benzene and toluene, and ethers such as diethyl ether, tetrahydrofuran, dioxane and ethylene glycol dimethyl ether. For convenience, the use of the solvent employed in the production of metallized polyolefin is preferred so that the metallated polyolefin can be used without separation. The ratio of anionic initiator, i.e., the metallized polyolefin, to total anionically polymerizable monomer is from about 1 milliequivalent to about 1,000 milliequivalents per 100 g of total readily polymerizable monomer. In preferred modifications of the process, from about 5 milliequivalents to about 100 milliequivalents of metallized polyolefin per 100 g of total monomer are used.

The production of block copolymers is conducted under polymerization conditions which include a reaction temperature of from about $-20°$ C. to about $150°$ C., preferably from about $20°$ C. to about $100°$ C. Since the process is conducted in a liquid phase, the reaction pressure is not critical. Largely for convenience, the process is typically conducted under ambient pressure. The solvent should be present in a sufficient quantity to maintain a low viscosity for the polymerization mixture and permit adequate contacting of reactants which is facilitated by shaking or stirring. If necessary, additional solvent is added. Typical weight ratios of the total solvent to total monomers to be polymerized are from about 3:1 to about 25:1. Weight ratios of solvent to total monomer from about 5:1 to about 10:1 are preferred.

The manner in which the block copolymer is prepared will depend upon the particular block copolymer product desired, but the sequence of reaction steps is broadly conventional. If a polymer of two blocks, i.e., a diblock, polymer is desired, the metallated polyolefin initiator is contacted with an anionically polymerizable monomer to "grow" a block of the monomer on the terminal portion of the polyolefin block. The product is a metal-capped or "living" diblock polymer. Three block or triblock polymers are produced by contacting the living diblock polymer with other monomer to produce the third block, thereby producing a metal-capped triblock polymer. Additional blocks are added sequentially in the same manner. When a block polymer of the desired number of blocks is obtained, the living polymer is "terminated" or "killed" by reaction with a terminating agent such as water, an alkanol, an alkanoic acid, benzaldehyde or chlorotrimethylsilane. This technology is well understood in the art and the product obtained is a linear block copolymer.

It is also useful, and well known, to produce block copolymers of linear and other configurations by the coupling of metallated or metal-capped polymer blocks with a variety of coupling agents. Conventional coupling agents include polyfunctional compounds including divinylaromatic hydrocarbons such as divinylbenzene, polyfunctional esters such as diethyladipate, dihalohydrocarbons such as dibromoethane and polyhalosilicon compounds such as silicon tetrachloride. The particular coupling agent employed with determine the type of block copolymer produced. By way of illustration, use of a dibromoethane coupling agent will result in formation of a linear polymer product whereas use of divinylbenzene will result in a configuration of block copolymer termed "star". The use of various coupling agents and the nature of the block copolymer product are well known and understood in the block copolymer art.

Coupling takes place by adding the coupling agent to the living block copolymer in one or in several increments. Generally from about 0.5 equivalent to about 1.5 equivalent of coupling agent is used per equivalent of living or metallated polymer. The coupling process is aided by agitation during coupling agent addition and typically is accomplished in a time from a few minutes to a few hours. Coupling times from about 1 minute to about 30 minutes are suitable and the coupling occurs under conditions substantially similar to the polymerization.

Subsequent to termination of the polymerization process, whether by coupling or addition of a terminating agent, the polymer product is recovered by conventional methods well known for block copolymers. In a frequently encountered modification, water, alcohol or steam is added to the polymer mixture to precipitate the polymer which is then recovered by conventional methods such as filtration or decantation. Antioxidants, stabilizers or other additives are usefully incorporated within the polymer by addition of the additive to the polymer mixture prior to precipitation. Other materials such as other polymer, fillers, dyes, pigments and reinforcing agents are compounded with the block copolymer by known methods. The block copolymers thereof are elastomeric and are useful in the applications conventional for block copolymers of monoalkenyl aromatic hydrocarbon and conjugated alkadiene.

The invention is further illustrated by the following Illustrative Embodiments which should not be regarded as limitations. In the Illustrative Embodiments, all reactions were conducted under rigorous exclusion of moisture and air. All glassware used was dried in an oven at 120° C. before use and all solvents were distilled from sodium-benzophenone before use.

Atactic propylene oligomers (APO) were prepared by catalytic propylene oligomerization with a homogenous cyclopentadiene zirconium dichloride/MAO catalyst. APO of varying molecular weight is prepared by control of reaction conditions APO of number average molecular weight ($\overline{M}_n$) of 700 was isolated by removing the catalyst and solvent through washing and subsequently drying the APO over freshly cut sodium. Lower molecular weight APO ($\overline{M}_n$ equals 230) was isolated by distillation of a crude APO mixture at reduced pressure (180° C., 5 mBar).

The styrene and isoprene used were of a quality standard for anionic polymerizations. Stabilized monomers such as t-butyl methacrylate were used after removal of the stabilizer.

The analyses of the Illustrative Embodiments were conducted by conventional procedures. The NMR spectra were taken from deuterochloroform at 200, 300 or 400 mHz. Molecular weights of polymers were determined by gel permeation chromatography using polystyrene standards. The degree of metallation of the APO species was determined by cooling to −50° C. the colored reaction mixture resulting from reaction of APO and n-butyllithium in hexane. A molar excess of chlorotrimethylsilane was added in a single addition and the temperature of the resulting mixture was allowed to warm to approximately 20° C. After about 15 minutes, sufficient water was added to effect phase separation. The upper organic layer was removed and washed twice with water. The hexane layer was then dried over magnesium sulfate, filtered and the volatile portion was removed under vacuum at 50° C. A light yellow, viscous oil remained. Proton and $^{13}C$ NMR of this oil were consistent with an atactic polypropylene oligomer wherein the terminal —CH=CH$_2$ groups were converted to —CH$_2$—CH$_2$Si(CH$_3$)$_2$ groups. The ratio of the total vinylidene group to the silylated vinylidene group was taken as a measure of metallation.

Illustrative Embodiment I

In a reaction, 1.0 g of APO ($\overline{M}_n$=230) was dissolved in 15 ml benzene. To this solution, 1.1 g of finely powdered potassium t-butoxide were added under conditions of vigorous stirring. To the resulting white suspension were added 4.7 ml of 1.6 N solution of n-butyllithium in hexane. After 4 hours, the intensely colored reaction mixture was cooled to −40° C. and 1 ml of tetrahydrofuran was added. The mixture was stirred at room temperature for 30 minutes to destroy excess n-butyllithium. Analysis as described above indicated that over 97% of the APO had been lithiated. No other identifiable products were indicated by NMR.

Illustrative Embodiment II

By a procedure substantially similar to that of Illustrative Embodiment I, APO of $\overline{M}_n$=700 was reacted and metallated. Analysis indicated that more than 97% of the APO had been lithiated.

Illustrative Embodiment III

A solution of lithiated APO was prepared by the procedure of Illustrative Embodiment I which contained 1 g of APO. The solution was cooled to −40° C. and 30 ml of isoprene were added in one addition while the resulting reaction mixture was stirred and maintained below −25° C. The resulting mixture was allowed to warm to room temperature over 30 minutes and stirred for an additional 2 hours. The reaction mixture was then cooled to −40° C. and the polymerization was terminated with chlorotrimethylsilane. The mixture was then warmed to room temperature over 15 minutes and stirred for an additional 15 minutes. The resulting solution was treated with water and the hexane layer removed, dried over magnesium sulfate and filtered. The hexane was then removed. Analysis of the product showed an APO-isoprene diblock polymer with a polyisoprene block of number average molecular weight of approximately 520. No APO was observed.

Illustrative Embodiment IV

An APO-poly(t-butyl methacrylate) diblock polymer was prepared by a procedure substantially similar to that of Illustrative Embodiment III except 14.5 mmol of t-butyl methacrylate was used instead of isoprene and the reaction was conducted as −10° C. After removal of the cooling bath the temperature warmed to room temperature and stirring continued for 1.5 hours. Termination was effected with 1.1 g of benzaldehyde instead of chlorotrimethylsilane and the hexane solution was washed with 5% aqueous sodium bicarbonate instead of water. Analysis of the product indicated an APO-poly(t-butyl methacrylate) diblock polymer wherein the number average molecular weight of the poly(t-butyl methacrylate) block was approximately 470.

Illustrative Embodiment V

The procedure of Illustrative Embodiment IV was substantially repeated except that the APO had a $\overline{M}_n$ of 700 and the ester was added at −40° C. followed by stirring at room temperature for 2 hours. The quantity of benzaldehyde added was 0.4 g and stirring continued after benzaldehyde addition for 30 minutes. Analysis of the product indicated as APO-poly(t-butyl methacrylate) diblock polymer wherein the $\overline{M}_n$ of the poly(t-butyl methacrylate) block was approximately 450.

Illustrative Embodiment VI

The procedure of Illustrative Embodiment V was substantially repeated except that the t-butyl methacrylate was replaced by 2 ml of styrene. The addition was at −78° C. and was followed by a 1.5 hour period of stirring at that temperature. The resulting mixture was allowed to warm to room temperature and stirring was continued for 30 minutes. For termination, 2 ml of chlorotrimethylsilane was used instead of benzaldehyde and water was used to wash the hexane layer. Analysis of the product indicated an APO-polystyrene diblock polymer wherein the polystyrene block had an $\overline{M}_n$ of approximately 400.

Illustrative Embodiment VII

The procedure of Illustrative Embodiment III was substantially repeated except that subsequent to isoprene addition the mixture was again cooled to −40° C. and 14.0 mmol of t-butyl methacrylate was added while the mixture was stirred. The resulting mixture was then allowed to warm to room temperature and stirred for 1.5 hours. The solution was then cooled to −40° C. and 1.1 g of benzaldehyde added. The mixture was then warmed over 30 minutes to room temperature and the product was isolated as described in Illustrative Embodiments IV and V.

Analysis of the product indicated an APO-polyisoprene -poly(t-butyl methacrylate) triblock polymer wherein the $\overline{M}_n$ of the polyisoprene block was approximately 520 and the $\overline{M}_n$ of the poly -(t-butyl methacrylate) was approximately 350.

Illustrative Embodiment VIII

An APO ($\overline{M}_n$=1500, 2 g, 1.3 mmol) was dissolved in dry hexane and 1.1 g of potassium t-butoxide was added followed by 4.7 ml of 1.6 N n-butyllithium. The reaction mixture was stirred for 18 hours at room temperature and 5 ml of dry tetrahydrofuran were added. The solution was warmed to 35° C. and 20 ml of isoprene were added in one addition. After 18 hours, 5 ml of chlorotrimethylsilane was added and the mixture stirred for 15 minutes, washed twice with water and dried over magnesium sulfate. After the solution was filtered, the volatiles were removed under vacuum to give 16.2 g of APO-polyisoprene block copolymer. The polyisoprene block had an $\overline{M}_n$ of approximately 10,000.

Illustrative Embodiment IX

An APO polymer ($\overline{M}_n$=9000, 2 g, 0.22 mmol) was dissolved in dry hexane and 1.1 g of potassium t-butoxide was added followed by 4.7 ml of 1.6 N n-butyllithium. The reaction mixture was stirred for 3.5 days at room temperature and 5 ml of dry tetrahydrofuran were added. The solution was stirred for 15 minutes and 300 mg of divinylbenzene were added. After additional stirring for 18 hours, the mixture was reacted with chlorotrimethylsilane for 12 hours. The resulting mixture was then washed with water, dried over magnesium sulfate and filtered. The volatiles were removed under vacuum to give 2.1 g of material, which analysis indicated was the star block polymer of APO and divinylbenzene.

What is claimed is:

1. A process for the production of a metallated derivative of a polyolefin comprising the steps of polymerizing an α-olefin having a vinylidene group in the terminal portion thereof, and contacting the base polyolefin with an alkyl alkali metal compound in the presence of inert hydrocarbon solvent, and an alkali metal t-alkoxide or a tertiary amine.

2. The process of claim 1 wherein the alkyl alkali metal compound is alkyllithium wherein the alkyl has from 2 to 8 carbon atoms inclusive.

3. The process of claim 2 wherein the alkali metal t-alkoxide or tertiary amine is potassium t-butoxide.

4. A process for the production of block copolymers of at least two blocks wherein at least one block is a saturated polyolefin block which comprises the steps of:
    polymerizing an α-olefin to form a base polyolefin having a vinylidene group in the terminal portion thereof;
    contacting the base polyolefin with an alkyl alkali metal compound in the presence of inert hydrocarbon solvent and an alkali metal t-alkoxide or a tertiary amine; and
    polymerizing an anionically polymerizable monomer in the presence of the metallated derivative of the base polyolefin and an inert solvent under polymerization conditions.

5. The process of claim 4 wherein the anionically polymerizable monomer monoalkenyl aromatic hydrocarbon, conjugated alkadiene or alkyl ester of α,β-ethylenically unsaturated carboxylic acid.

6. The process of claim 5 wherein the ratio of metallized derivative to total monomer is from about 1 milliequivalent to about 1000 milliequivalent of metallated derivative per 100 g of total monomer.

7. The process of claim 5 wherein the monomer is styrene.

8. The process of claim 5 wherein the monomer is isoprene.

9. The process of claim 5 wherein the monomer is t-butyl methacrylate.

* * * * *